United States Patent
Chen et al.

(10) Patent No.: US 10,356,615 B2
(45) Date of Patent: Jul. 16, 2019

(54) METHOD AND APPARATUS FOR ACCESSING WIRELESS LOCAL AREA NETWORK

(71) Applicant: Beijing Xiaomi Mobile Software Co., Ltd., Haidian District, Beijing (CN)

(72) Inventors: Yong Chen, Beijing (CN); Qiuzhi Huang, Beijing (CN); Zhuang Qian, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 232 days.

(21) Appl. No.: 15/392,096

(22) Filed: Dec. 28, 2016

(65) Prior Publication Data
US 2017/0223532 A1 Aug. 3, 2017

(30) Foreign Application Priority Data

Jan. 29, 2016 (CN) .......................... 2016 1 0065643

(51) Int. Cl.
*H04L 29/06* (2006.01)
*H04W 12/06* (2009.01)
(Continued)

(52) U.S. Cl.
CPC ......... *H04W 12/06* (2013.01); *H04L 63/0428* (2013.01); *H04L 63/06* (2013.01);
(Continued)

(58) Field of Classification Search
CPC ............... G06F 21/6227; G06F 21/602; G06F 2221/2107; G06F 17/30554; H04L 9/083;
(Continued)

(56) References Cited

U.S. PATENT DOCUMENTS 8,937,971 B1    1/2015 Vellanki
2012/0099572 A1* 4/2012 Kato .................... H04W 88/06
                                                            370/338
(Continued)

FOREIGN PATENT DOCUMENTS

CN    101473670 A    7/2009
CN    101951691 A    1/2011
(Continued)

OTHER PUBLICATIONS

PCT International Search Report and Written Opinion, PCT/CN2016/097792, dated Nov. 25, 2016, 14 pages.
(Continued)

*Primary Examiner* — Tri M Tran
(74) *Attorney, Agent, or Firm* — Arch & Lake LLP

(57) ABSTRACT

A method and an apparatus are provided for accessing a wireless LAN. The method includes: accessing a first wireless LAN generated by a routing device when a smart device is in a station mode, in which the access permission of the first wireless LAN is restricted such that accessing other addresses except for that of a target server for the first wireless LAN is forbidden; receiving an encryption protocol packet including verification information sent by the routing device when it is determined that the smart device is a trusted device by the routing device; receiving by the smart device a decrypting information sent by the target server, and performing a decryption on the encryption protocol packet according to the decrypting information to obtain verification information, and accessing a second wireless LAN according to the verification information, in which the second wireless LAN has an unlimited access permission.

6 Claims, 11 Drawing Sheets

(51) Int. Cl.
*H04W 12/08* (2009.01)
*H04W 84/12* (2009.01)
*H04W 12/04* (2009.01)
*H04W 12/00* (2009.01)

(52) U.S. Cl.
CPC ........ *H04L 63/083* (2013.01); *H04L 63/0838* (2013.01); *H04L 63/0853* (2013.01); *H04L 63/0876* (2013.01); *H04L 63/105* (2013.01); *H04L 63/107* (2013.01); *H04W 12/003* (2019.01); *H04W 12/04031* (2019.01); *H04W 12/08* (2013.01); *H04W 84/12* (2013.01); *H04W 12/00503* (2019.01); *H04W 12/00504* (2019.01)

(58) Field of Classification Search
CPC ............... H04L 9/0891; H04L 63/0428; H04L 2209/04; H04L 2463/041; H04L 63/102; H04L 67/18
See application file for complete search history.

(56) References Cited

U.S. PATENT DOCUMENTS

| | | | |
|---|---|---|---|
| 2012/0239923 A1* | 9/2012 | Karl | H04L 41/0806 713/153 |
| 2014/0093079 A1* | 4/2014 | Scott | H04L 63/08 380/270 |
| 2015/0350910 A1 | 12/2015 | Eramian | |
| 2016/0337945 A1* | 11/2016 | Watt | H04W 76/10 |
| 2017/0099152 A1* | 4/2017 | Kojima | H04L 63/061 |

FOREIGN PATENT DOCUMENTS

| | | |
|---|---|---|
| CN | 104243467 A | 12/2014 |
| CN | 105744595 A | 7/2016 |
| WO | 2011014698 A1 | 2/2011 |

OTHER PUBLICATIONS

European Patent Office, Extended European Search Report, Application No. 17151620.6, dated Apr. 3, 2017, 8 pages.

* cited by examiner

METHOD AND APPARATUS FOR ACCESSING WIRELESS LOCAL AREA NETWORK

CROSS-REFERENCE TO RELATED APPLICATION

The present application claims the priority of Chinese patent application No. 201610065643.3, filed on Jan. 29, 2016, the entire content of which is incorporated herein by reference.

TECHNICAL FIELD

The present disclosure generally relates to a communication technology field, and more particularly relates to a method, apparatus and non-transitory computer readable medium for accessing a wireless local area network (LAN).

BACKGROUND

A coordination of a computer is often needed when photos are exported from a camera. As cameras having wireless fidelity (Wi-Fi) modules grow in popularity, a user may read photos in a camera directly by a smart device (such as a mobile phone) via Wi-Fi. The network card of a camera is set as an access point (AP) mode when camera mobile phone is coupled to the camera via Wi-Fi. In the AP mode, the camera may be used as a hotspot to enable the mobile phone to access the camera, such that the data in the camera may be read by the mobile phone after the mobile phone accesses a Wi-Fi generated by the camera, however, a network may exist that may not be accessed by the mobile phone.

SUMMARY

The present disclosure provides a method, an apparatus and non-transitory computer readable medium for accessing a wireless LAN.

A method for accessing a wireless local area network (LAN), applied in a smart device is provided. The method may include: accessing a first wireless LAN generated by a routing device when the smart device is in a station mode, in which an access permission of the first wireless LAN is restricted such that accessing an address of a target server for the first wireless LAN is permitted and accessing other addresses except for that of the target server is forbidden; receiving an encryption protocol packet comprising verification information sent by the routing device when the smart device is determined as a trusted device by the routing device; performing a decryption on the encryption protocol packet according to decrypting information acquired from the target server to obtain the verification information, after the target server determines that the smart device is a device meeting a predetermined condition; and accessing a second wireless LAN according to the verification information, in which the second wireless LAN has an unlimited access permission.

An apparatus is provided for accessing a wireless LAN, applied in a smart device. The apparatus may include: a processor; memory, configured to store instructions executable by the processor; wherein the processor may be configured to: access a first wireless LAN generated by a routing device when the smart device is in a station mode, in which an access permission of the first wireless LAN is restricted such that accessing an address of a target server for the first wireless LAN is permitted and accessing other addresses except for that of the target server is forbidden; receive an encryption protocol packet comprising verification information sent by the routing device when the smart device is determined as a trusted device by the routing device; perform a decryption on the encryption protocol packet according to decrypting information acquired from the target server to obtain the verification information after the target server determines that the smart device is a device meeting a predetermined condition; and access a second wireless LAN according to the verification information, in which the second wireless LAN has an unlimited access permission.

A non-transitory computer-readable storage medium having stored therein instructions is provided. The instructions, when executed by a processor of a terminal device, causes the terminal device to: access a first wireless LAN generated by a routing device when a smart device is in a station mode, in which an access permission of the first wireless LAN is restricted such that accessing an address of a target server for the first wireless LAN is permitted and accessing other addresses except for that of the target server is forbidden; receive an encryption protocol packet comprising verification information sent by the routing device when the smart device is determined as a trusted device by the routing device; perform a decryption on the encryption protocol packet according to decrypting information acquired from the target server to obtain the verification information, after the target server determines that the smart device is a device meeting a predetermined condition; and access a second wireless LAN according to the verification information, in which the second wireless LAN has an unlimited access permission.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

Figure 1:
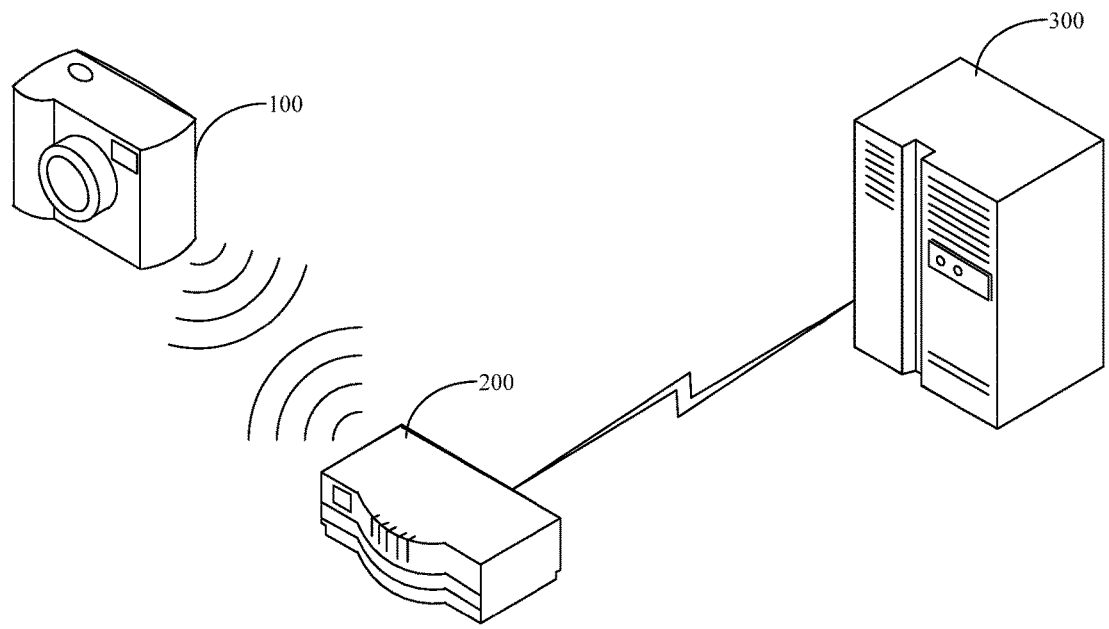
FIG. 1 is a schematic diagram showing an implementation environment involved in the present disclosure.
Figure 1A:
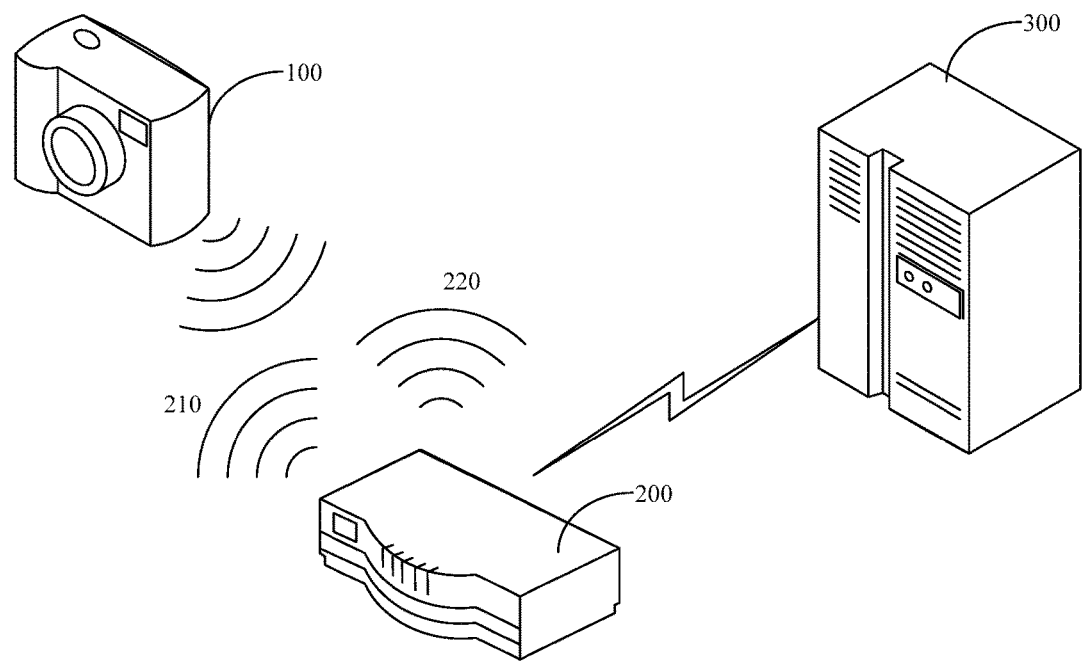
FIG. 1A shows a schematic diagram showing another implementation environment involved in the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary examples, which are illustrated in the accompanying drawings. The following description refers to the accompanying drawings in which the same numbers in different drawings represent the same or similar elements unless otherwise represented. The implementations set forth in the following description of exemplary examples do not represent all implementations consistent with the disclosure. Instead, they are merely examples of apparatuses and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The network card of a camera is set as an access point (AP) mode when camera mobile phone is coupled to the camera via Wi-Fi. In the AP mode, the camera may be used as a hotspot to enable the mobile phone to access the camera, such that the data in the camera may be read by the mobile phone after the mobile phone accesses a Wi-Fi generated by the camera, however, a network may exist and may not be accessed by the mobile phone. The camera may be set as a station mode (STA) mode, and other Wi-Fi may be coupled for accessing network in the STA mode.

At first, an application scene involved in the present disclosure is introduced before introductions of a method for accessing a wireless local area network (LAN) according to the present disclosure are made. FIG. 1 is a schematic diagram showing an implementation environment involved in the present disclosure. As shown in FIG. 1, the implementation environment may include: a smart device 100, a routing device 200 and a server 300, in which the smart device 100 may support a wireless LAN, such as a camera having a Wi-Fi module, and the Wi-Fi module may support an access point (AP) mode and a station mode (STA) mode. The routing device 200 may be a router. The routing device 200 may provide a first wireless LAN 210 a second wireless LAN 220. The first wireless LAN 210 may provide a restricted access to a pre-determined server while the second wireless LAN 220 may provide an unlimited access. The unlimited access provides the smart device 100 with access to the Internet. However, the unlimited access may not allow the smart device 100 to access some websites based on local setup of the routing device. In some cases, the unlimited access may not allow the smart device 100 to access the server 300.

The server 300 may be a server or a server cluster consists of several servers, or may be a cloud computing service center. When the smart device 100 is in an AP mode, other terminals (such as a camera, a tablet PC, a smart television, a smart watch, a personal digital assistant (PDA), a portable computer, etc.) may be coupled to the smart device 100 via a wireless LAN, and thus data (such as pictures, videos, etc.) in the smart device 100 may be read out. The smart device 100 may access a network address of a server 300 and that of others via a wireless LAN when the smart device is in a STA mode. Either the smart device 100 or the server 300 may initiate or serve the wireless LAN. The smart device 100, the routing device 200 and the server may be connected via a wired network or a wireless network. Sometimes, the routing device 200 and the server 300 may be implemented as one device.

Figure 2:
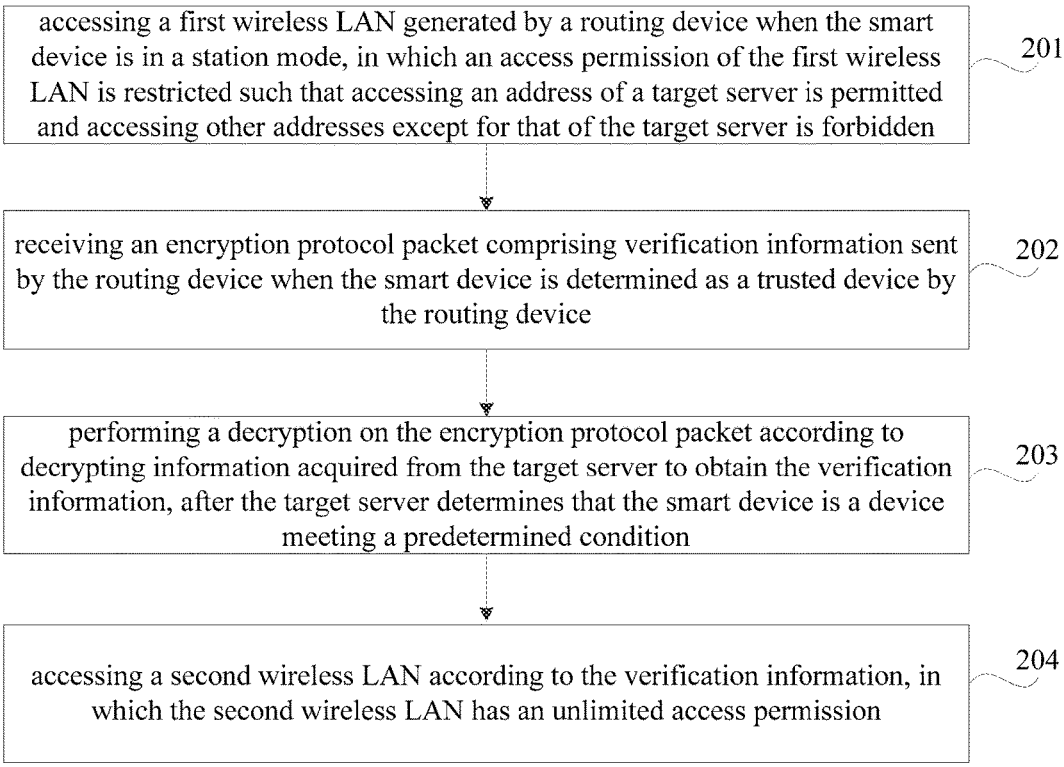
FIG. 2 is a flow chart showing a method for accessing a wireless LAN according to an exemplary example.

FIG. 2 is a flow chart showing a method for accessing a wireless LAN according to an exemplary example, and the method may be applied in a smart device, in which the smart device may be a smart device 100 in the implementation environment shown in FIG. 1. As shown in FIG. 2, the method may include following steps.

In step 201, a first wireless LAN generated by a routing device is accessed when the smart device is in a station mode, and an accessing permission of the first wireless LAN is restricted such that accessing an address of a target server for the first wireless LAN is permitted and accessing other addresses except for that of the target server is forbidden.

The station mode is the STA mode. Because the smart device does not know a service set identifier (SSID) and a password of the routing device and the routing device does not know a security of the smart device, the smart device firstly accesses the first wireless LAN generated by the routing device, and the access permission of the first wireless LAN is restricted such that only accessing an address allowed by the access permission is permitted, for example, only the accessing of the address of the target server is permissible. The target server may be a specific server, for example, the target server and the routing device are made by a same manufacturer, and the target server is a server for providing a user with various services by the manufacturer, and therefore the target server may identify the smart device.

For example, the access permission of the first wireless LAN may only include the address of the target server. The target server may be a specific server according to a setup of the routing device. A default setup of the routing device may list a few servers for the user to select. One of the default setup may provide the target server from a same manufacturer that manufactures the routing device. In another example, the default setup may set the target server as a server that provides a user with various services, and therefore the target server may have necessary information including the identity of the smart device. Accordingly, the target server may identify the smart device based on the identity of the smart device.

In step 202, an encryption protocol packet including verification information sent by the routing device is received when it is determined that the smart device is a trusted device by the routing device.

In step 203, after the target server determines that the smart device is a device meeting a predetermined condition, a decryption on the encryption protocol packet is performed according to decrypting information acquired from the target server to obtain verification information.

In step 204, a second wireless LAN is accessed according to the verification information, in which the second wireless LAN has unlimited access permission.

Figure 3:
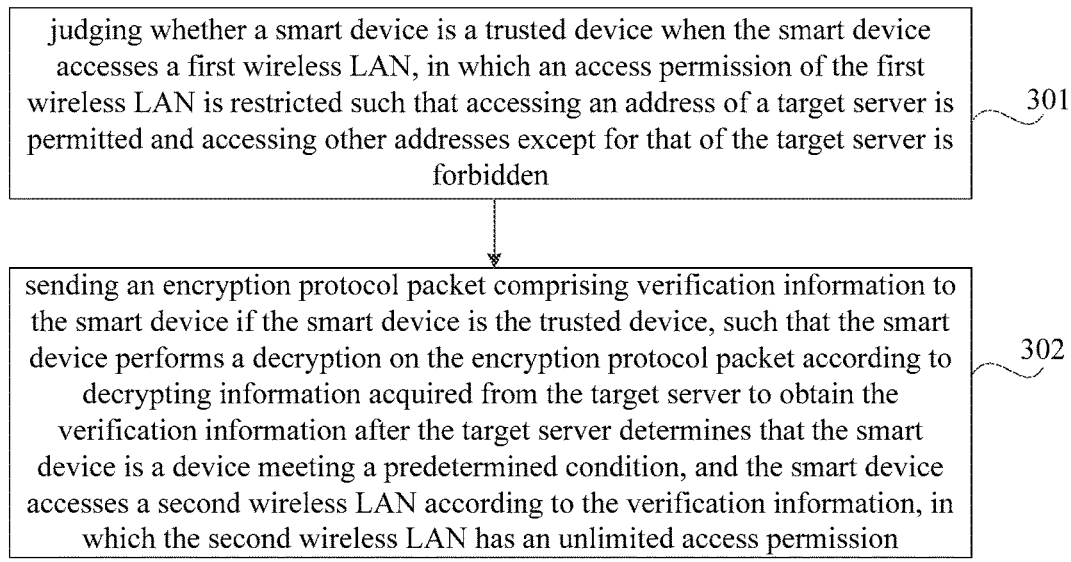
FIG. 3 is a flow chart showing another method for accessing a wireless LAN according to an exemplary example.

FIG. 3 is a flow chart showing another method for accessing a wireless LAN according to an exemplary example, and the method may be applied in a routing device, in which the routing device may be the routing device 200 in the implementation environment shown in FIG. 1. As shown FIG. 3, the method may include following steps.

In step 301, whether a smart device is a trusted device is judged or determined when the smart device accesses a first wireless LAN, and an accessing permission of the first wireless LAN is restricted such that accessing an address of a target server is permitted and accessing other addresses except for that of the target server is forbidden.

In step 302, if the smart device is the trusted device, an encryption protocol packet including verification information is sent to the smart device such that the smart device performs a decryption on the encryption protocol packet according to decrypting information acquired from a target server to obtain the verification information after the target server determines that the smart device is a device meeting a predetermined condition, and the smart device accesses a second wireless LAN according to the verification information, in which the second wireless LAN has an unlimited access permission.

Figure 4:
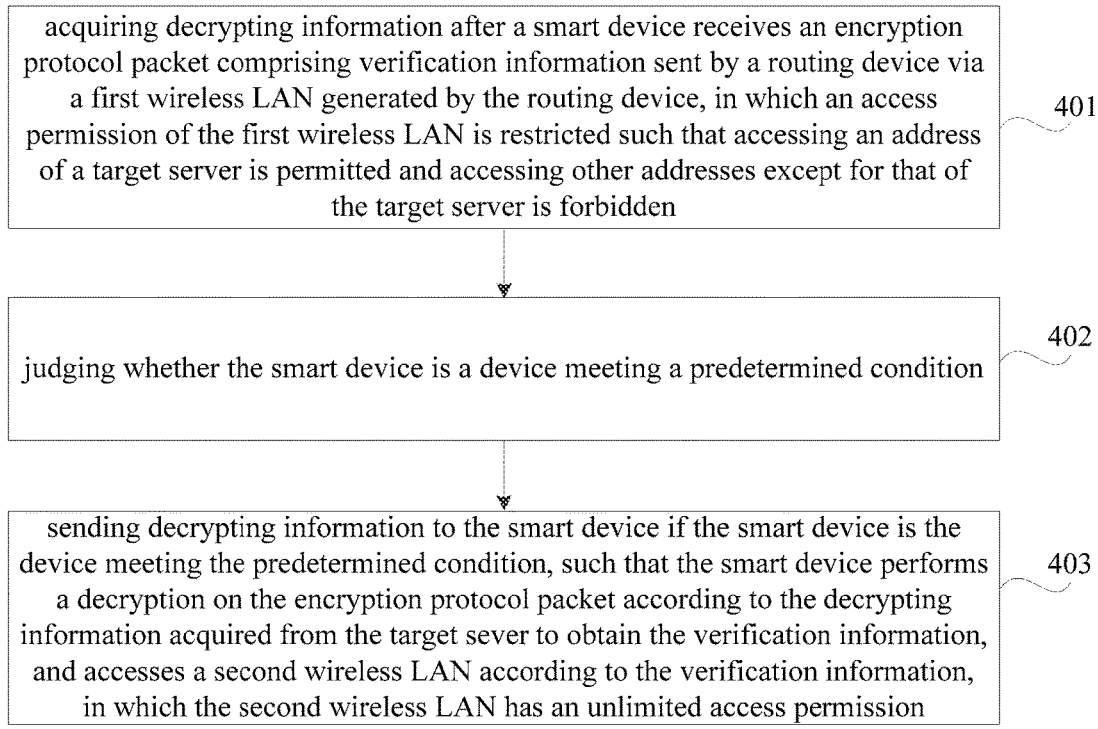
FIG. 4 is a flow chart showing yet another method for accessing a wireless LAN according to an exemplary example.

FIG. 4 is a flow chart showing yet another method for accessing a wireless LAN according to an exemplary example, and the method may be applied in a target server, and the target server may be the server 300 in the implementation environment shown in FIG. 1. As shown in FIG. 4, the method may include following steps.

In step 401, decrypting information is acquired after a smart device receives an encryption protocol packet including verification information sent by a routing device via a first wireless LAN generated by the routing device, in which an accessing permission of the first wireless LAN is restricted such that accessing an address of a target server is permitted and accessing other addresses except for that of the target server is forbidden.

In step 402, it is judged whether the smart device is a device meeting a predetermined condition.

In step 403, if the smart device is the device meeting the predetermined condition, decrypting information is sent to the smart device such that the smart device performs a decryption on the encryption protocol packet according to the decrypting information acquired from the target server to obtain the verification information, and accesses a second wireless LAN according to the verification information, in which the second wireless LAN has an unlimited access permission.

In conclusion, with the method for accessing the wireless LAN according to examples of the present disclosure, the first wireless LAN generated by the routing device is accessed when the smart device is in the station mode, and the access permission of the first wireless LAN is restricted such that accessing the address of the target server is permitted and accessing other addresses except for that of the target server is forbidden. The encryption protocol packet including verification information sent by the routing device is received when it is determined that the smart device is the trusted device by the routing device; after the target server determines that the smart device is the device meeting the predetermined condition such as the smart device is for a particular manufacturer, the smart device receives decrypting information sent by the target server, and the decryption on the encryption protocol packet is performed according to the decrypting information to obtain verification information, such that the smart device accesses the second wireless LAN according to the verification information, in which the second wireless LAN has an unlimited access permission. With the present disclosure, a problem of complex operations caused by requiring a password to be input every time a wireless LAN is accessed in a station mode is solved, and automatic access to a wireless LAN provided by the routing device is realized, such that a simplification effect of operation for accessing a wireless LAN is achieved.

Figure 5:
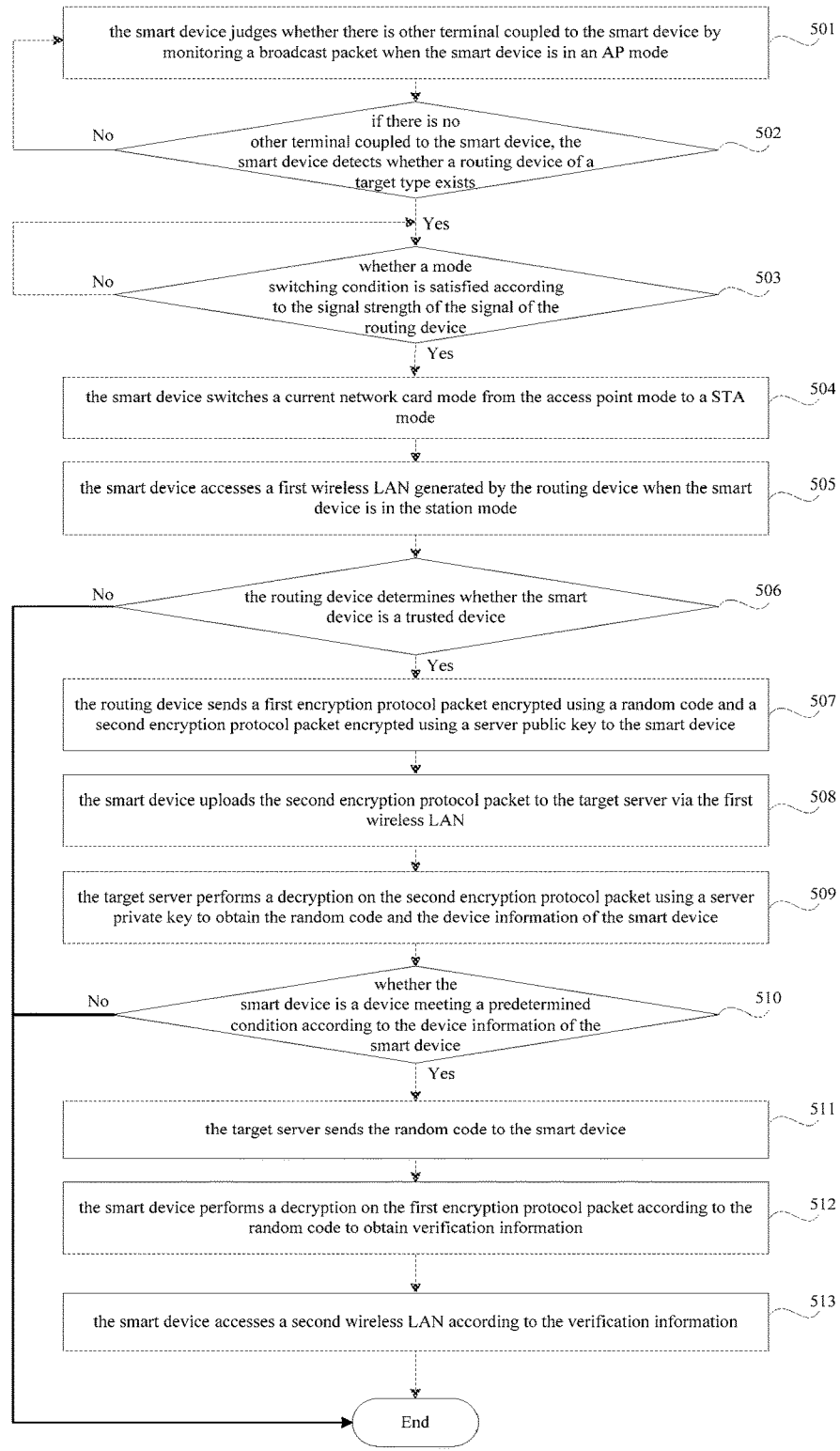
FIG. 5 is a flow chart showing a method for accessing a wireless LAN according to another exemplary example.

FIG. 5 is a flow chart showing a method for accessing a wireless LAN according to another exemplary example, and the method may be applied in the implementation environment shown in FIG. 1. In this example, a smart device may be the smart device 100 in the implementation environment shown in FIG. 1, a routing device may be the routing device 200 in the implementation environment shown in FIG. 1, and a target server may be the server 300 in the implementation environment shown in FIG. 1. Besides, all wireless LANs according to the example may be Wi-Fi networks. As shown in FIG. 5, the method may include following steps.

In step 501, the smart device judges whether there is other terminal coupled to the smart device by monitoring a broadcast packet when the smart device is in an access point (AP) mode.

In step 502, if there is no other terminal coupled to the smart device, the smart device detects whether a routing device of a target type exists.

Exemplarily, whether a routing device of a target type exists may be detected in following ways.

First, it is detected whether a signal of the routing device exists by monitoring.

For example, the routing device generally sends a signal out periodically, in which the signal may be a beacon frame for instance to inform other device of its own existence, and therefore an existence of the routing device may be determined when the smart device receives a signal sent by the routing device.

Next, whether the routing device is of the target type is detected when it is monitored that the signal of the routing device exists. In this example, the routing device of the target type may be a device of a specified manufacturer. Therefore, the smart device may acquire a basic service set identifier (BSSID) of the routing device first, in which the BSSID is a media access control (MAC) address of the routing device, and then a manufacturer of the routing device is determined according to the BSSID of the routing device. Therefore, it may be judged or determined whether the manufacturer of the routing device is the specified manufacturer, in which the specified manufacturer may be one or more predetermined manufacturers, and it may be determined that the routing device is of the target type if the manufacturer of the routing device is the specified manufacturer.

If the routing device of the target type is found, step 503 is performed on the routing device, otherwise, step 501 will be returned and executed.

In step 503, the smart device judges or determines whether a mode switching condition is satisfied according to the signal strength of the signal of the routing device.

The routing device is of the target type determined in step 502. Exemplarily, if it is determined that the signal strength of the signal of the routing device is greater than a strength threshold value, it is determined that the mode switching condition is satisfied. If it is determined that the mode switching condition is satisfied, the smart device performs step 504. If the mode switching condition is not satisfied, step 503 will be returned and executed.

In step 504, the smart device switches a current network card mode from the access point mode to a station (STA) mode.

After it has been switched to the station mode, a wireless LAN may be accessed through following steps.

In step 505, the smart device accesses a first wireless LAN generated by the routing device when the smart device is in the station mode.

Because the smart device does not know a service set identifier (SSID) and a password of the routing device and the routing device does not know the security of the smart device, the smart device accesses a first wireless LAN generated by the routing device first, in which the first wireless LAN is a wireless LAN having no password and a hidden SSID, and the access permission of the first wireless LAN is restricted, only an accessing of an address (the address herein may be an IP address or a domain name) allowed by the access permission is permissible, for example, only an accessing of an address of the target server is permissible. The target server may be a specific server.

For example, the smart device, the target server and the routing device may be made by a same manufacturer. Alternatively or additionally, at least two among the smart device, the target server and the routing device may be devices of different manufacturers, and there is a specific authorization relationship between or among the different manufacturers. The target server may be a server that provides a user with various services by the manufacturer, and therefore the target server may identify the smart device, and the smart device is allowed to access the target server. For example, when the smart device is a smart device (such as a smart camera, a smart camera, etc.) produced by manufacturer A, the router is a router that is also produced by manufacturer A, and the target server may also be a server of manufacturer A. The server may be a data server that provides backup service to the smart device. Additionally or alternatively, the server may be any server selected according to setup of the smart device or setup of the router.

In step 506, the routing device determines whether the smart device is a trusted device.

Exemplarily, it may be judged whether the smart device is a trusted device according to a distance between the smart device and the routing device. For example, first, the distance between the smart device and the routing device is determined according to a signal strength of the signal of the smart device; if the distance between the smart device and the routing device is less than a predetermined distance, the smart device is determined as a trusted device. The predetermined distance may be 2 meters for instance, if the smart device is within 2 meters away from the routing device, the routing device regards the smart device as a trusted device. If it is determined that the smart device is a trusted device, the routing device performs step 507; if it is determined that the smart device is not a trusted device, the process ends.

In step 507, the routing device sends a first encryption protocol packet encrypted using a random code and a second encryption protocol packet encrypted using a server public key to the smart device.

The first encryption protocol packet includes verification information, the verification information is used for performing a verification for accessing the second wireless LAN, and the second wireless LAN has an unlimited access permission, and the verification information may include a SSID and a password of the second wireless LAN, and the second encryption protocol packet may include a random code and device information of the smart device, and the device information can be used for identifying a manufacturer and a model of the smart device, etc.

In step 508, the smart device uploads the second encryption protocol packet to the target server via the first wireless LAN. The device information included in the second encryption protocol packet may be obtained and added by using the server or the routing device or the smart device or any combination of them. In one example, the smart device may use the public key to encrypt the device information stored in the smart device and add the encrypted device information to the second encryption protocol packet before uploading the packet to the server.

In step 509, the target server performs a decryption on the second encryption protocol packet using a server private key to obtain the random code and the device information of the smart device.

The server private key is a secret key corresponding to the above-mentioned server public key stored in the target server, in which the two secret keys can be an encryption or a decryption to each other, in which the server public key is public, and the server private key is confidential to devices except the target server.

In step 510, the target server judges whether the smart device is a device meeting a predetermined condition according to the device information of the smart device.

Exemplarily, the device meeting the predetermined condition may be a device of a specified manufacturer for instance. Therefore, it is may be judged or determined whether the smart device is of the specified manufacturer according to the device information (such as a serial number of the smart device, an MAC address, etc.) of the smart device. If the smart device is of the specified manufacturer, then it is determined that the smart device is the device meeting the predetermined condition, and step 511 is performed; if the smart device is not of the specified manufacturer, then the process ends.

Alternatively, the predetermined condition may be that the smart device can be identified as a permitted device for using the network. For example, the smart device may belong to a company and may be operated by an employee of a company, and the smart device may meet the predetermined condition when the smart device is within the company's network and is identified as a permitted device to access the company's network such as a wireless LAN.

As an additional example, the predetermined condition may be met when the smart device is within a distance range limit of the wireless LAN. For instance, a coffee shop may operate a wireless LAN with a certain distance range limit and allow anyone inside the coffee shop to use its network. As such, the smart device may meet the predetermined condition and connect to the wireless LAN when it is inside the coffee shop. Thus, the smart device may be identified as a permitted device when it is within a certain distance range limit of the coffee shop.

In step 511, the target server sends the random code to the smart device.

In step 512, the smart device performs a decryption on the first encryption protocol packet according to the random code to obtain verification information.

In step 513, the smart device accesses a second wireless LAN according to the verification information.

As described in step 507, the verification information is used for performing the verification when the second wireless LAN is accessed, and may include a SSID and a password of the second wireless LAN. Because the access permission of the second wireless LAN is not restricted, the smart device may access the internet normally after the second wireless LAN is accessed by the smart device. Thus, it can be seen that an access of the wireless LAN may be realized without inputting a password, in this way, the complexity of operation is simplified.

In addition, if the smart device is a smart camera, in case that the smart camera is in a STA mode, when the smart camera closes to the routing device, a wireless LAN provided by the routing device may be accessed through the above-mentioned method. Because most of the current cameras are not provided with a keyboard for inputting numbers or letters, by this method, a step of inputting a password by a smart camera may be omitted, and an operation for accessing a wireless LAN by a camera may be simplified.

In conclusion, in the method for accessing the wireless LAN according to examples of the present disclosure, the first wireless LAN generated by the routing device is accessed when the smart device is in the station mode, and the access permission of the first wireless LAN is restricted such that accessing the address of the target server is permitted and accessing other addresses except for that of the target server is forbidden. The encryption protocol packet including verification information sent by the routing device is received when it is determined that the smart device is a trusted device by the routing device; after the target server determines that the smart device is a device meeting a predetermined condition, the smart device receives decrypting information sent by the target server, and the decryption on the encryption protocol packet is performed according to the decrypting information to obtain verification information, such that the second wireless LAN is accessed according to the verification information, in which the second wireless LAN has an unlimited access permission. With the present disclosure, a problem of complex operations caused by requiring a password to be input every time a wireless LAN is accessed in a station mode is solved, and automatic access to a wireless LAN provided by the routing device is realized, such that a simplification effect of an operation for accessing a wireless LAN is achieved.

Figure 6A:
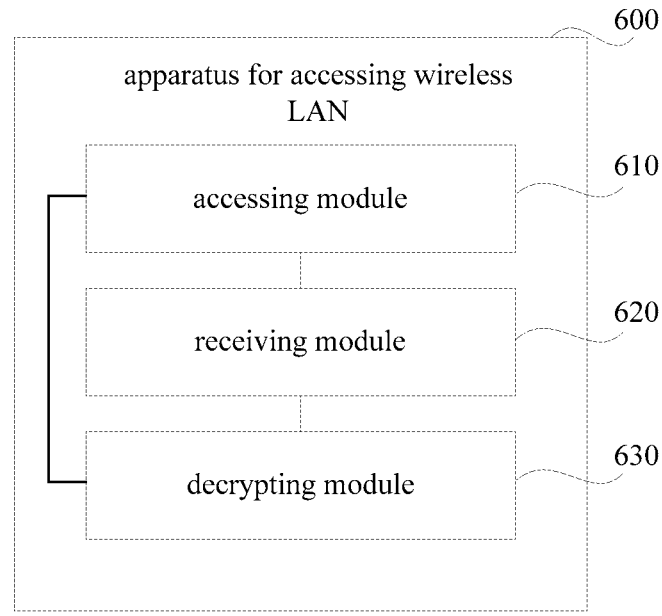
FIG. 6A is a block diagram showing an apparatus for accessing a wireless LAN according to an exemplary example.

FIG. 6A is a block diagram showing an apparatus for accessing a wireless LAN according to an exemplary example. The apparatus 600 may be used for implementing the method shown in FIG. 2 or FIG. 5, and the apparatus 600 may be applied in a smart device, and a part or all of the smart device may be implemented by a software or a hardware or a combination thereof, and the smart device may be the smart device 100 in the implementation environment shown in FIG. 1. Referring to FIG. 6A, the apparatus 600 includes:

an accessing module 610, configured to access a first wireless LAN generated by a routing device when the smart device is in a station mode, in which the access permission of the first wireless LAN is restricted such that accessing an address of a target server is permitted and accessing other addresses except for that of the target server is forbidden;

a receiver 620, configured to receive an encryption protocol packet including verification information sent by the routing device when it is determined that the smart device is a trusted device by the routing device;

a decrypting module 630, configured to perform a decryption on an encryption protocol packet according to decrypting information acquired from the target server after the target server determines that the smart device is a device meeting a predetermined condition to obtain verification information, in which the accessing module 610 is further configured to access a second wireless LAN according to the verification information, in which the second wireless LAN has an unlimited access permission.

Alternatively, the receiver 620 is configured to:

receive a first encryption protocol packet encrypted using a random code and a second encryption protocol packet encrypted using a server public key sent by a routing device when the smart device is determined as a trusted device by the routing device, in which the first encryption protocol packet includes the verification information, and the second encryption protocol packet includes the random code.

Figure 6B:
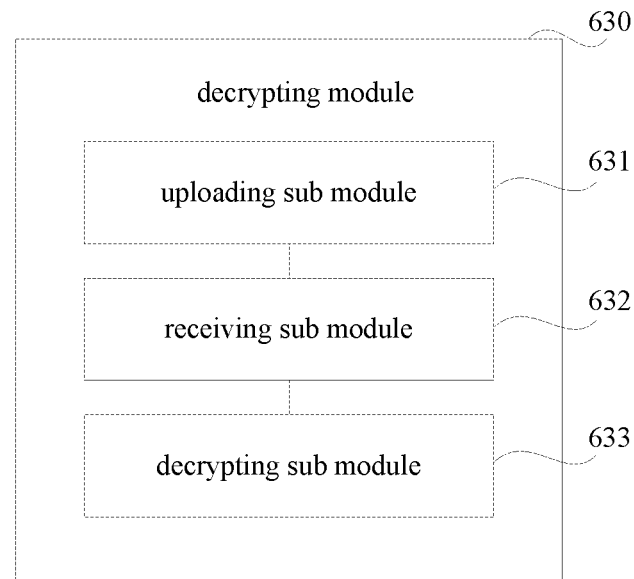
FIG. 6B is a block diagram showing a decrypting module according to the example shown in FIG. 6A.

Alternatively, FIG. 6B is a block diagram showing a decrypting module according to the example shown in FIG. 6A. Referring to FIG. 6B, the decrypting module 630 includes:

an uploading sub module 631, configured to upload the second encryption protocol packet to the target server via the first wireless LAN, such that the target server performs a decryption on the second encryption protocol packet using a server private key to obtain the random code;

a receiving sub module 632, configured to receive the random code sent by the target server after the target server determines that the smart device is the device meeting the predetermined condition;

a decrypting sub module 633, configured to perform a decryption on the first encryption protocol packet according to the random code to obtain the verification information.

Figure 6C:
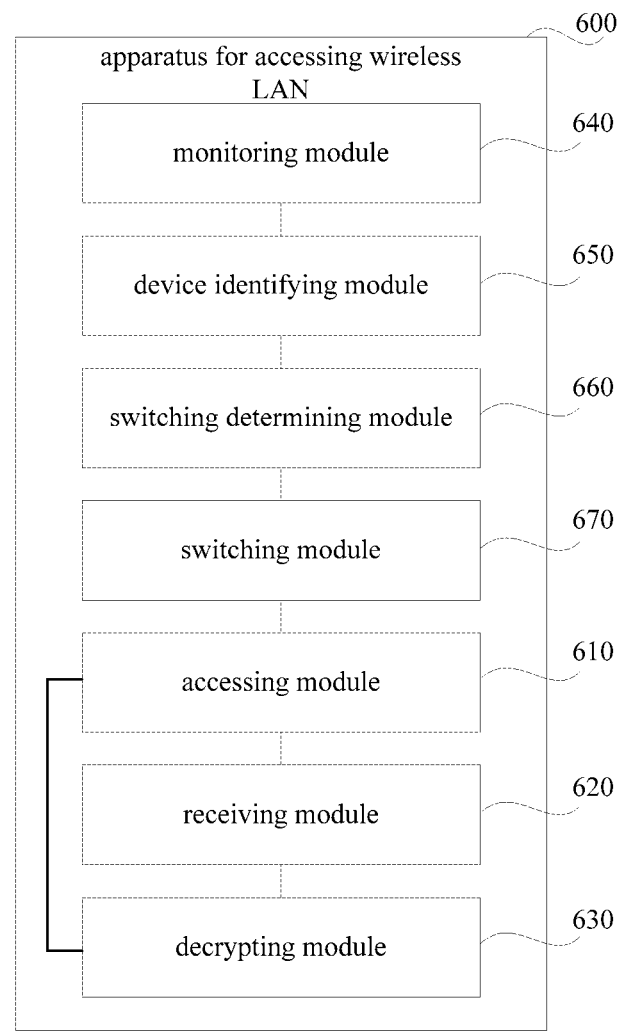
FIG. 6C is a block diagram showing another apparatus for accessing a wireless LAN according to an exemplary example.

Alternatively, FIG. 6C is a block diagram showing another apparatus for accessing a wireless LAN according to an exemplary example. Referring to FIG. 6C, the apparatus 600 further includes:

a monitoring module 640, configured to judge whether a signal of the routing device exists by monitoring when the smart device is in an access point mode without any terminal coupled to the smart device;

a device identifying module 650, configured to detect whether the routing device is of a target type when it is monitored that the signal of the routing device exists;

a switching determining module 660, configured to judge whether a mode switching condition is satisfied according to a signal strength of the signal of the routing device when it is detected that the routing device is of the target type;

a switching module 670, configured to switch a current network card mode from the access point mode to the station mode when the mode switching condition is satisfied.

Figure 6D:
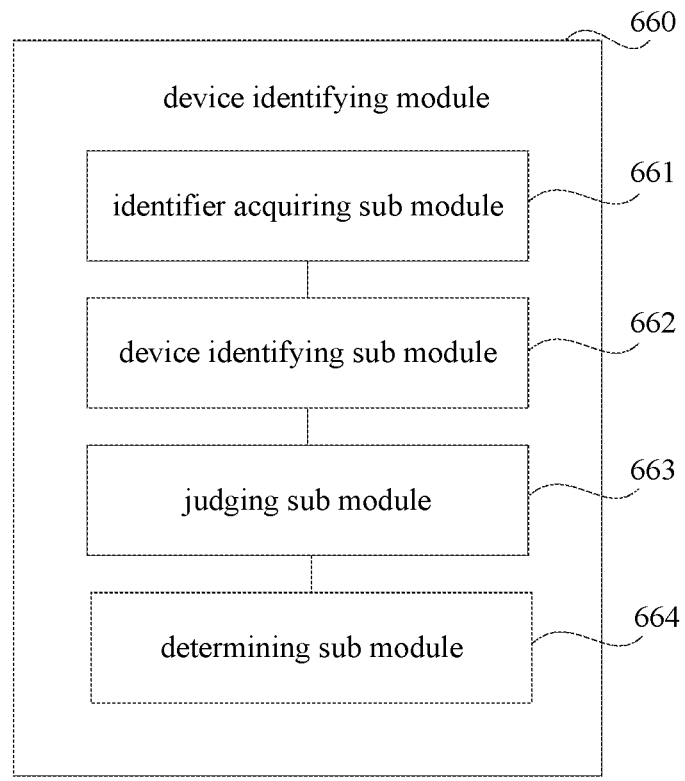
FIG. 6D is a block diagram showing a device identifying module according to the example shown in FIG. 6C.

Alternatively, FIG. 6D is a block diagram showing a device identifying module according to the example shown in FIG. 6C. Referring to FIG. 6D, the device identifying module 660 includes:

an identifier acquiring sub module 661, configured to acquire a BSSID of the routing device;

a device identifying sub module 662, configured to determine a manufacturer of the routing device according to the BSSID;

a judging sub module 663, configured to judge whether the manufacturer of the routing device is a specified manufacturer;

a determining sub module 664, configured to determine that the routing device is of the target type if the manufacturer of the routing device is the specified manufacturer.

Figure 7A:
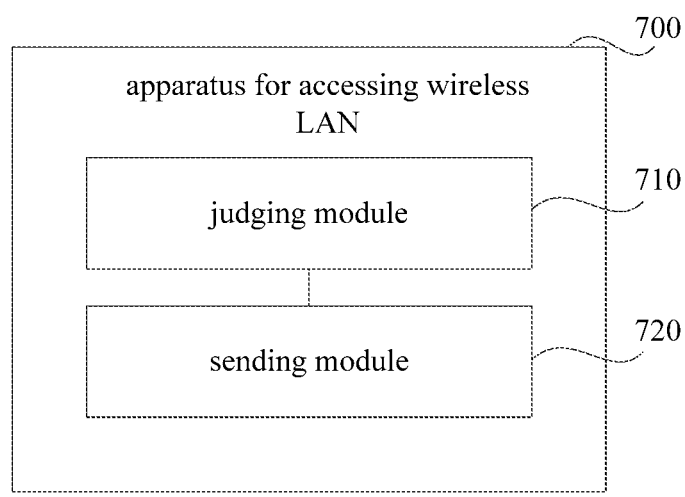
FIG. 7A is a block diagram showing an apparatus for accessing a wireless LAN according to an exemplary example.

FIG. 7A is a block diagram showing an apparatus for accessing a wireless LAN according to an exemplary example. The apparatus 700 may be used for performing the method shown in FIG. 3 or FIG. 5, and the apparatus 700 may be applied in a routing device, and a part or all of the routing device may be implemented by a software or a hardware or a combination thereof, the routing device may be the routing device 200 in the implementation environment shown in FIG. 1. Referring to FIG. 7A, the apparatus 700 includes:

a judging module 710, configured to judge whether a smart device is a trusted device when the smart device accesses a first wireless LAN, in which an access permission of the first wireless LAN is restricted such that accessing an address of a target server is permitted and accessing other addresses except for that of the target server is forbidden;

a sending module 720, configured to send an encryption protocol packet including verification information to the smart device if the smart device is the trusted device, such that the smart device performs a decryption on the encryption protocol packet according to decrypting information acquired from the target server to obtain the verification information after the target server determines that the smart device is a device meeting a predetermined condition, and the smart device accesses a second wireless LAN according to the verification information, in which the second wireless LAN has an unlimited access permission.

Alternatively, the sending module 720 is configured to:

send a first encryption protocol packet encrypted using a random code and a second encryption protocol packet encrypted using a server public key to a smart device if the smart device is the trusted device, in which the first encryption protocol packet includes the verification information, and the second encryption protocol packet includes the random code, such that the smart device uploads the second encryption protocol packet to the target server, such that the target server performs a decryption on the second encryption protocol packet using a server private key to obtain the random code, and then the random code is sent to the smart device after it is determined that the smart device is the device meeting the predetermined condition, in which the random code is used by the smart device for performing a decryption on the first encryption protocol packet to obtain the verification information, and the second wireless LAN is accessed by the smart device according to the verification information.

Figure 7B:
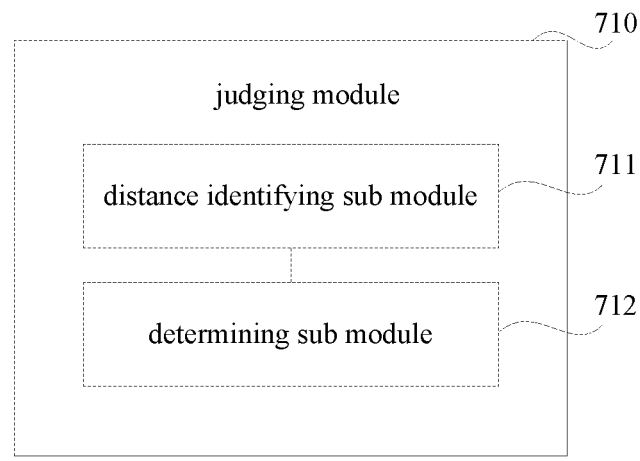
FIG. 7B is a block diagram showing a judging module according to the example shown in FIG. 7A.

Alternatively, FIG. 7B is a block diagram showing a judging module according to the example shown in FIG. 7A. Referring to FIG. 7B, the judging module 710 includes:

a distance identifying sub module 711, configured to determine a distance between the smart device and the routing device according to a signal strength of the signal of the smart device;

a determining sub module 712, configured to determine that the smart device is the trusted device if the distance between the smart device and the routing device is less than a predetermined distance.

Figure 8A:
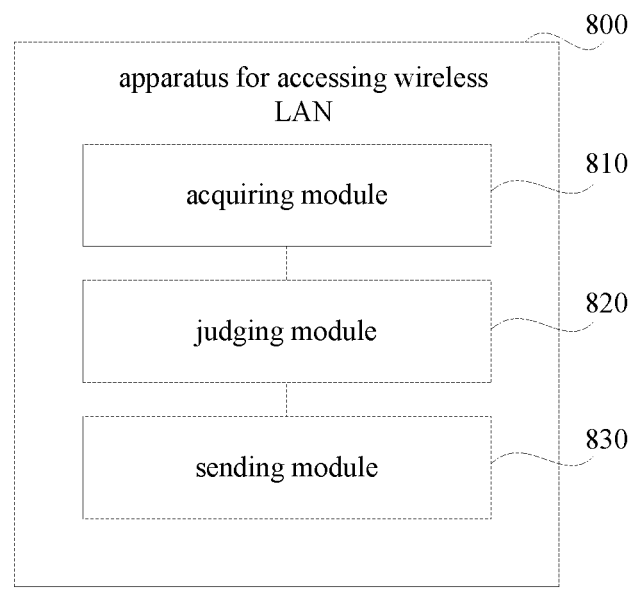
FIG. 8A is a block diagram showing an apparatus for accessing a wireless LAN according to an exemplary example.

FIG. 8A is a block diagram showing an apparatus for accessing a wireless LAN according to an exemplary example. The apparatus 800 may be used for performing the method shown in FIG. 4 or FIG. 5, and the apparatus 800 may be applied in a target server, and a part or all of the target server may be implemented by a software or a hardware or a combination thereof, and the target server may be the server 300 in the implementation environment shown in FIG. 1. Referring to FIG. 8A, the apparatus 800 includes:

an acquiring module 810, configured to acquire decrypting information after a smart device receives an encryption protocol packet including verification information sent by a routing device via a first wireless LAN generated by the routing device, in which an access permission of the first wireless LAN is restricted such that accessing an address of a target server is permitted and accessing other addresses except for that of the target server is forbidden;

a judging module 820, configured to judge whether the smart device is a device meeting a predetermined condition;

a sending module 830, configured to send decrypting information to the smart device if the smart device is the device meeting the predetermined condition, such that the smart device performs a decryption on the encryption protocol packet according to the decrypting information acquired from the target server to obtain the verification information, and accesses a second wireless LAN according to the verification information, in which the second wireless LAN has an unlimited access permission.

Figure 8B:
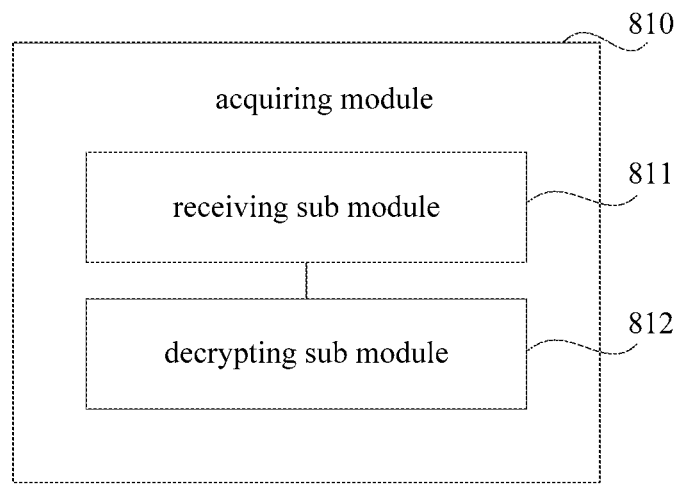
FIG. 8B is a block diagram showing an acquiring module according to the example shown in FIG. 8A.

Alternatively, FIG. 8B is a block diagram showing an acquiring module according to the example shown in FIG. 8A. Referring to FIG. 8B, the acquiring module 810 includes:

a receiving sub module 811, configured to receive a second encryption protocol packet uploaded by the smart device via the first wireless LAN after the smart device receives a first encryption protocol packet encrypted using a random code and the second encryption protocol packet encrypted using a server public key which are sent by the routing device via the first wireless LAN;

a decrypting sub module 812, configured to perform a decryption on the second encryption protocol packet using a server private key to obtain the random code.

Figure 8C:
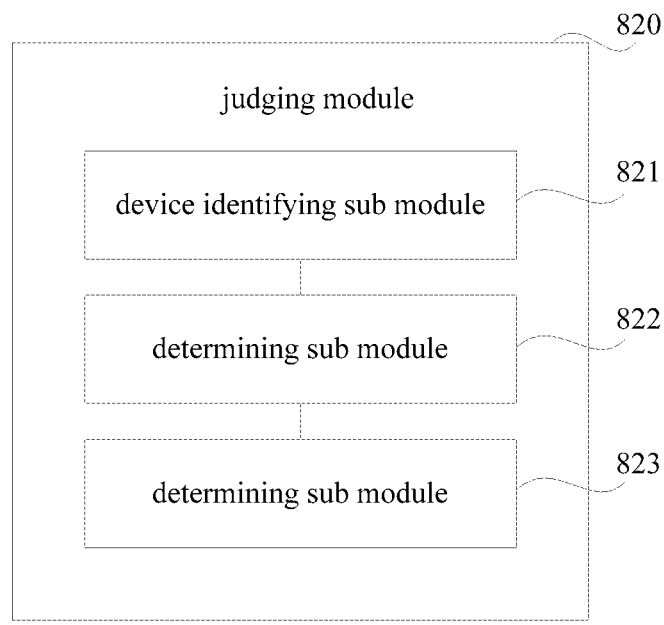
FIG. 8C is a block diagram showing a judging module according to the example shown in FIG. 8A.

Alternatively, the second encryption protocol packet further includes device information of the smart device. FIG. 8C is a block diagram showing a judging module according to the example shown in FIG. 8A. Referring to FIG. 8C, the judging module 820 may include:

a device identifying sub module 821, configured to determine a manufacturer of the smart device according to the device information obtained after the decryption on the second encryption protocol packet is performed using the server private key;

a determining sub module 822, configured to judge whether the manufacturer of the smart device is a specified manufacturer;

a determining sub module 823, configured to determined that the smart device is the device meeting the predetermined condition if the manufacturer of the smart device is the specified manufacturer.

With respect to the specific manners for performing operations for individual modules in the devices in above examples, reference is made to those described in detail in the examples regarding the methods, which will not be explained in detail herein.

There is provided a communication system in examples of the present disclosure. The communication system includes: a smart device, a routing device, and a target server, in which the relation between the smart device, the routing device and the target server may be a relation as shown in the implementation environment shown in FIG. 1, which will not be explained in detail herein.

The smart device may include any one of the apparatuses 600 for accessing wireless LANs in FIG. 6A to FIG. 6D;

the routing device may include the apparatus 700 for accessing the wireless LAN in FIG. 7A or FIG. 7B;

the target server may include the apparatus 800 for accessing the wireless LAN in any one of FIG. 8A to FIG. 8C.

According to a first aspect of examples of the present disclosure, a method for accessing a wireless LAN is provided, applied in a smart device. The method includes:

accessing a first wireless LAN generated by a routing device when the smart device is in a station mode, in which an access permission of the first wireless LAN is restricted such that accessing an address of a target server is permitted and accessing other addresses except for that of the target server is forbidden;

receiving an encryption protocol packet including verification information sent by the routing device when the smart device is determined as a trusted device by the routing device;

performing a decryption on the encryption protocol packet according to decrypting information acquired from the target server to obtain the verification information, after the target server determines that the smart device is a device meeting a predetermined condition;

accessing a second wireless LAN according to the verification information, in which the second wireless LAN has an unlimited access permission.

According to a second aspect of examples of the present disclosure, a method for accessing a wireless LAN is provided, applied in a routing device. The method includes:

judging whether a smart device is a trusted device when the smart device accesses a first wireless LAN, in which an access permission of the first wireless LAN is restricted such that accessing an address of a target server is permitted and accessing other addresses except for that of the target server is forbidden;

sending an encryption protocol packet including verification information to the smart device if the smart device is the trusted device, such that the smart device performs a decryption on the encryption protocol packet according to decrypting information acquired from the target server to obtain the verification information after the target server determines that the smart device is a device meeting a predetermined condition, and the smart device accesses a second wireless LAN according to the verification information, in which the second wireless LAN has an unlimited access permission.

According to a third aspect of examples of the present disclosure, a method for accessing a wireless LAN is provided, applied in a target server. The method includes:

acquiring decrypting information after a smart device receives an encryption protocol packet including verification information sent by a routing device via a first wireless LAN generated by the routing device, in which an access permission of the first wireless LAN is restricted such that accessing an address of a target server is permitted and accessing other addresses except for that of the target server is forbidden;

judging whether the smart device is a device meeting a predetermined condition;

sending decrypting information to the smart device if the smart device is the device meeting the predetermined condition, such that the smart device performs a decryption on the encryption protocol packet according to the decrypting information acquired from the target sever to obtain the verification information, and accesses a second wireless LAN according to the verification information, in which the second wireless LAN has an unlimited access permission.

According to a fourth aspect of examples of the present disclosure, an apparatus for accessing a wireless LAN is provided, applied in a smart device. The apparatus includes:

an accessing module, configured to access a first wireless LAN generated by a routing device when the smart device is in a station mode, in which an access permission of the first wireless LAN is restricted such that accessing an address of a target server is permitted and accessing other addresses except for that of the target server is forbidden;

a receiver, configured to receive an encryption protocol packet including verification information sent by the routing device, when the smart device is determined as a trusted device by the routing device;

a decrypting module, configured to perform a decryption on the encryption protocol packet according to decrypting information acquired from the target server after the target server determines that the smart device is a device meeting a predetermined condition to obtain the verification information;

wherein the accessing module is further configured to access a second wireless LAN according to the verification information, in which the second wireless LAN has an unlimited access permission.

According to a fifth aspect of examples of the present disclosure, an apparatus for accessing a wireless LAN is provided, applied in a routing device. The apparatus includes:

a judging module, configured to judge whether a smart device is a trusted device when the smart device accesses a first wireless LAN, in which an access permission of the first wireless LAN is restricted such that accessing an address of a target server is permitted and accessing other addresses except for that of the target server is forbidden;

a sending module, configured to send an encryption protocol packet including verification information to the smart device if the smart device is the trusted device, such that the smart device performs a decryption on the encryption protocol packet according to decrypting information acquired from the target server to obtain the verification information after the target server determines that the smart device is a device meeting a predetermined condition, and the smart device accesses a second wireless LAN according to the verification information, in which the second wireless LAN has an unlimited access permission.

According to a sixth aspect of examples of the present disclosure, an apparatus for accessing a wireless LAN is provided, applied in a target server. The apparatus includes:

an acquiring module, configured to acquire decrypting information after a smart device receives an encryption protocol packet including verification information sent by a routing device via a first wireless LAN generated by the routing device, in which an access permission of the first wireless LAN is restricted such that accessing an address of a target server is permitted and accessing other addresses except for that of the target server is forbidden;

a judging module, configured to judge whether the smart device is a device meeting a predetermined condition;

a sending module, configured to send decrypting information to the smart device if the smart device is the device meeting the predetermined condition, such that the smart device performs a decryption on the encryption protocol packet according to the decrypting information acquired from the target sever to obtain the verification information, and accesses a second wireless LAN according to the verification information, in which the second wireless LAN has an unlimited access permission.

According to a seventh aspect of examples of the present disclosure, an apparatus for accessing a wireless LAN is provided, applied in a smart device. The apparatus includes:

a processor;

a memory, configured to store instructions executable by the processor;

wherein the processor is configured to:

access a first wireless LAN generated by a routing device when the smart device is in a station mode, in which an access permission of the first wireless LAN is restricted such that accessing an address of a target server is permitted and accessing other addresses except for that of the target server is forbidden;

receive an encryption protocol packet including verification information sent by the routing device when the smart device is determined as a trusted device by the routing device;

perform a decryption on the encryption protocol packet according to decrypting information acquired from the target server to obtain the verification information after the target server determines that the smart device is a device meeting a predetermined condition;

access a second wireless LAN according to the verification information, in which the second wireless LAN has an unlimited access permission.

According to an eighth aspect of examples of the present disclosure, an apparatus for accessing a wireless LAN is provided, applied in a routing device. The apparatus includes:

a processor;

a memory, configured to store instructions executable by the processor;

wherein the processor is configured to:

judge whether a smart device is a trusted device when the smart device accesses a first wireless LAN, in which an access permission of the first wireless LAN is restricted such that accessing an address of a target server is permitted and accessing other addresses except for that of the target server is forbidden;

send an encryption protocol packet including verification information to the smart device if the smart device is a trusted device, such that the smart device performs a decryption on the encryption protocol packet according to decrypting information acquired from the target server to obtain the verification information after the target server determines that the smart device is a device meeting a predetermined condition, and the smart device accesses a second wireless LAN according to the verification information, in which the second wireless LAN has an unlimited access permission.

According to a ninth aspect of examples of the present disclosure, an apparatus for accessing a wireless LAN is provided, applied in a target server. The apparatus includes:

a processor;

a memory configured to store instructions executable by the processor;

wherein the processor is configured to:

acquire decrypting information after a smart device receives an encryption protocol packet including verification information sent by a routing device via a first wireless LAN generated by the routing device, in which an access permission of the first wireless LAN is restricted such that accessing an address of a target server is permitted and accessing other addresses except for that of the target server is forbidden;

judge whether the smart device is a device meeting a predetermined condition;

send decrypting information to the smart device if the smart device is the device meeting the predetermined condition, such that the smart device performs a decryption on the encryption protocol packet according to the decrypting information acquired from the target sever to obtain the verification information, and the smart device accesses a second wireless LAN according to the verification information, in which the second wireless LAN has an unlimited access permission.

According to a tenth aspect of examples of the present disclosure, a communication system is provided, including: a smart device, a routing device and a target server;

the smart device including an apparatus for accessing a wireless LAN according to the fourth aspect of examples of the present disclosure;

the routing device including an apparatus for accessing a wireless LAN according to the fifth aspect of examples of the present disclosure;

the target server including an apparatus for accessing a wireless LAN according to the sixth aspect of examples of the present disclosure.

According to an eleventh aspect of examples of the present disclosure, a communication system is provided, including: a smart device, a routing device and a target server;

the smart device including an apparatus for accessing a wireless LAN according to the seventh aspect of examples of the present disclosure;

the routing device including an apparatus for accessing a wireless LAN according to the eighth aspect of examples of the present disclosure;

the target server including an apparatus for accessing a wireless LAN according to the ninth aspect of examples of the present disclosure.

Figure 9:
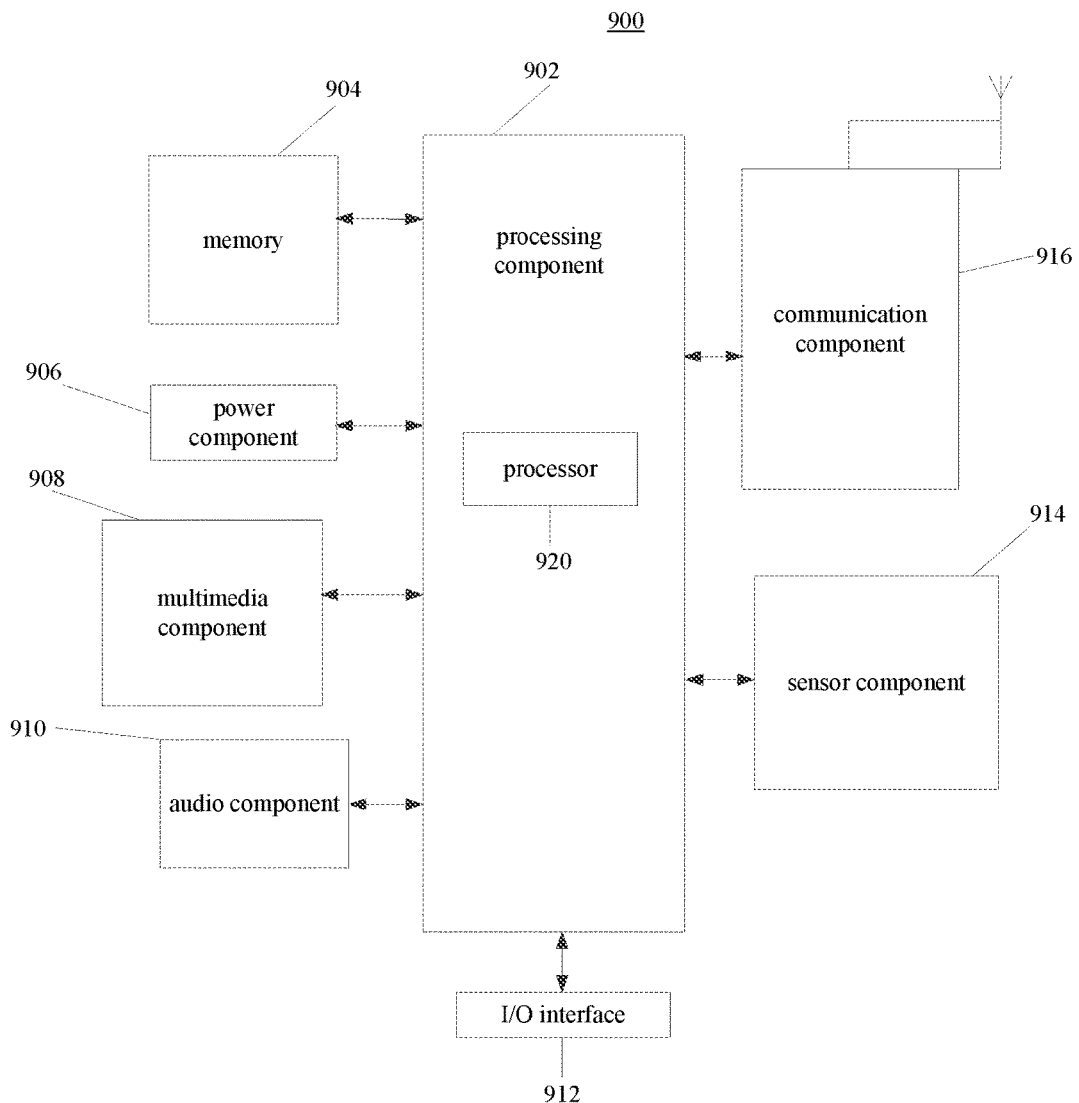
FIG. 9 is a block diagram showing an apparatus for accessing a wireless LAN according to an exemplary example.

FIG. 9 is a block diagram showing an device 900 for accessing a wireless LAN according to an exemplary example. For example, the device 900 may be a smart camera, a routing device, a mobile phone, a computer, a digital broadcasting terminal, a message receiving and sending equipment, a game controller, a tablet device, a medical equipment, a fitness equipment, a PDA, and so on.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions so as to perform all or part of the steps in the above described methods for accessing the wireless LAN. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, videos, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some examples, the multimedia component 908 includes a front camera and/or a rear camera. The front camera and/or the rear camera may receive external multimedia data when the device 900 is in an operation mode, such as a photographing mode or a video mode. At least one of the front camera and the rear camera may be a fixed optical lens system, or have focus and optical zoom capability.

The audio component 910 is configured to output and/or input an audio signal. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some examples, the audio component 910 further includes a speaker to output audio signals.

The I/O interface 912 provides an interface between the processing component 902 and a peripheral interface module, such as a keyboard, a click wheel, a button, and the like. The button may include, but are not limited to, a home button, a volume button, a starting button, and a locking button.

The sensor component 914 includes one or more sensors to provide status assessments of various aspects of the device 900. For instance, the sensor component 914 may detect an on/off status of the device 900, relative position of a component (e.g., the display and the keypad) of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as a WIFI network, a 2G network, or a 3G network, or a combination thereof. In one exemplary example, the communication component 916 receives a broadcast signal or broadcast associated information from an external broadcast management system via a broadcast channel. In one exemplary example, the communication component 916 further includes a near field communication (NFC) module to facilitate short-range communications. For example, the NFC module may be implemented based on a technology such as a radio frequency identification (RFID) technology, an infrared data association (IrDA) technology, an ultra-wideband (UWB) technology, a Bluetooth (BT) technology, and other technologies.

In exemplary examples, the device 900 may be implemented with one or more circuitries, which include an application specific integrated circuit (ASIC), a digital signal processor (DSP), a digital signal processing device (DSPD), a programmable logic device (PLD), a field programmable gate arrays (FPGA), a controller, a micro-controller, a microprocessor, or other electronic components. The device 900 may use the circuitries in combination with the other hardware or software components for performing the above described methods. Each module, sub-module, unit, or sub-unit disclosed above may be implemented at least partially using the one or more circuitries.

In exemplary examples, there is also provided a non-transitory computer-readable storage medium including instructions, such as the memory 904 including instructions, and the instructions are executable by the processor 920 of the device 900, for performing the above-described methods. For example, the non-transitory computer-readable storage medium may be a ROM, a random access memory (RAM), a CD-ROM, a magnetic tape, a floppy disc, an optical data storage device, and the like.

Figure 10:
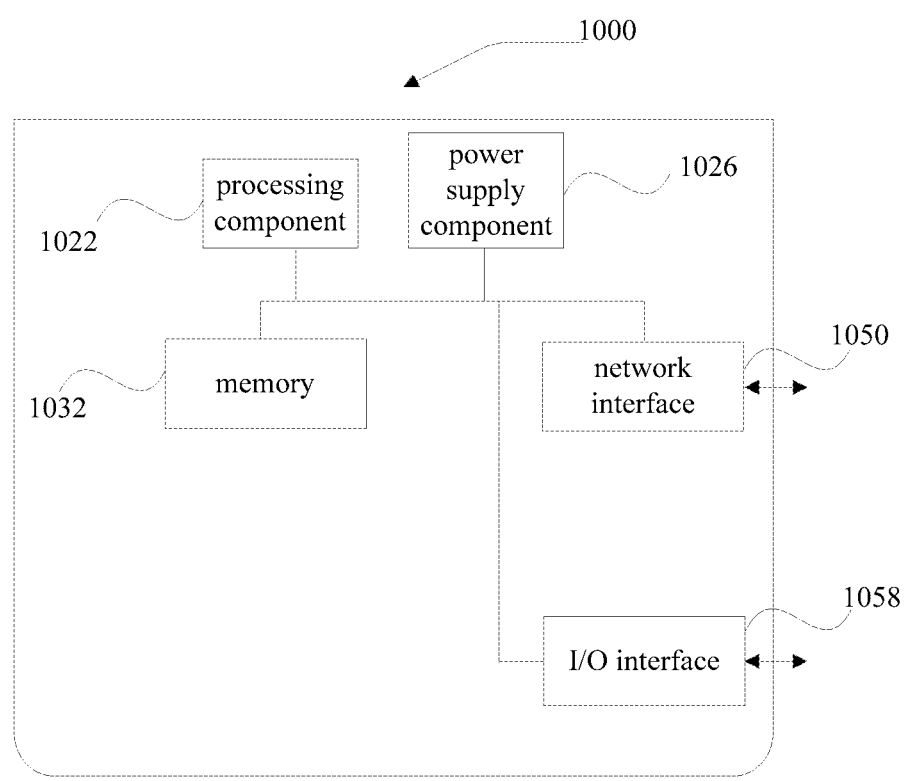
FIG. 10 is a block diagram showing an apparatus for accessing a wireless LAN according to an exemplary example.

FIG. 10 is a block diagram showing an apparatus 1000 for accessing a wireless LAN according to an exemplary example. For example, apparatus 1000 may be provided as a server. Referring to FIG. 10, the apparatus 1000 includes a processing component 1022, and further includes one or more processors, and a memory resource represented by the memory 1032 for storing instructions that can be executed by the processing component 1022, such as an application program. The application program stored in the memory 1032 may include one or more modules each corresponding to a group of instructions. In addition, the processing component 1022 is configured to execute the instructions to execute the above-described method for accessing the wireless LAN.

The apparatus 1000 may further include one power supply component 1026 configured to execute the power management of the apparatus 1000; one wired or wireless network interface 1050 configured to couple the apparatus 1000 to a network; and one input/output (I/O) interface 1058. The apparatus 1000 may operate operating systems stored in the memory 1032, such as Windows Server™, Mac OS X™, Unix™, Linux™, FreeBSD™ and so on.

Moreover, there is further provided an apparatus 1 for accessing a wireless LAN in examples of the present disclosure, applied in a smart device. The apparatus 1 includes:
a processor;
a memory configured to store instructions executable by the processor,
in which the processor is configured to:
access a first wireless LAN generated by the routing device when a smart device is in a station mode, in which an access permission of the first wireless LAN is restricted such that accessing an address of a target server is permitted and accessing other addresses except for that of the target server is forbidden;
receive an encryption protocol packet including verification information sent by the routing device when the smart device is determined as a trusted device by the routing device;
perform a decryption on the encryption protocol packet according to decrypting information acquired from a target server to obtain the verification information after the target server determines that the smart device is a device meeting a predetermined condition;
access a second wireless LAN according to the verification information, in which the second wireless LAN has an unlimited access permission.

There is further provided an apparatus 2 for accessing a wireless LAN in examples of the present disclosure, applied in a routing device. The apparatus 2 includes:
a processor;
a memory configured to store instructions executable by the processor,
in which the processor is configured to:
judge whether a smart device is a trusted device when the smart device is coupled to a first wireless LAN, in which an access permission of the first wireless LAN is restricted such that accessing an address of a target server is permitted and accessing other addresses except for that of the target server is forbidden;
send an encryption protocol packet including verification information to the smart device if the smart device is the trusted device, such that the smart device performs a decryption on the encryption protocol packet according to decrypting information acquired from the target server to obtain the verification information after the target server determines that the smart device is a device meeting a predetermined condition, and the smart device accesses a second wireless LAN according to the verification information, in which the second wireless LAN has an unlimited access permission.

There is further provided an apparatus 3 for accessing wireless LAN in examples of the present disclosure, applied in a target server. The apparatus 3 includes:
a processor;
a memory configured to store instructions executable by the processor,
in which the processor is configured to:
acquire decrypting information after a smart device receives an encryption protocol packet including verification information sent by a routing device via a first wireless LAN generated by the routing device, in which an access permission of the first wireless LAN is restricted such that accessing an address of a target server is permitted and accessing other addresses except for that of the target server is forbidden;
judge whether the smart device is a device meeting a predetermined condition;
send decrypting information to the smart device if the smart device is the device meeting the predetermined condition, such that the smart device performs a decryption on the encryption protocol packet according to the decrypting information acquired from the target sever to obtain the verification information, and the smart device accesses a second wireless LAN according to the verification information, in which the second wireless LAN has an unlimited access permission.

Therefore, there is further provided another communication system in examples of the present disclosure. The communication system includes: a smart device, a routing device and a target server, in which the relation between the smart device, the routing device and the target server may be as shown in the implementation environment shown in FIG. 1, which will not be explained in detail herein.

The smart device may include the above-mentioned apparatus 1 for accessing the wireless LAN;
the routing device may include the above-mentioned apparatus 2 for accessing the wireless LAN;
the target server may include the above-mentioned apparatus 3 for accessing the wireless LAN.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Other examples of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for accessing a wireless local area network (LAN), applied in a smart device, comprising:
    accessing a first wireless LAN generated by a routing device when the smart device is in a station mode, wherein an access permission of the first wireless LAN is restricted such that accessing an address of a target server for the first wireless LAN is permitted and accessing other addresses except for that of the target server is forbidden;
    receiving, by the smart device, a first encryption protocol packet encrypted using a random code and a second encryption protocol packet encrypted using a server public key sent by the routing device when the smart device is determined as a trusted device by the routing device, wherein the first encryption protocol packet comprises verification information, and the second encryption protocol packet comprises the random code;
    uploading the second encryption protocol packet to the target server via the first wireless LAN, such that the target server performs a second decryption on the second encryption protocol packet using a server private key to obtain the random code;
    receiving the random code sent by the target server, after the target server determines that the smart device is a device meeting a predetermined condition;
    performing a first decryption on the first encryption protocol packet according to the random code to obtain the verification information; and
    accessing a second wireless LAN according to the verification information, wherein the second wireless LAN has an unlimited access permission;
    wherein the method further comprises:
    judging whether a signal of the routing device exists by monitoring, when the smart device is in an access point mode without any other smart device wirelessly coupled to the smart device;
    detecting whether the routing device is of a target type when it is monitored that the signal of the routing device exists, wherein the target type specifies at least one manufacturer;
    judging whether a mode switching condition is met according to a signal strength of the signal of the routing device when it is detected that the routing device is of the target type; and
    switching a current network card mode of the smart device from the access point mode to the station mode when the mode switching condition is met.

2. The method according to claim 1, wherein detecting whether the routing device is of the target type comprises:
    acquiring a basic service set identifier (BSSID) of the routing device;
    determining a manufacturer of the routing device according to the BSSID;
    judging whether the manufacturer of the routing device is a specified manufacturer; and
    determining that the routing device is of the target type if the manufacturer of the routing device is the specified manufacturer.

3. An apparatus for accessing a wireless LAN, applied in a smart device, comprising:
    a processor;
    a memory, configured to store instructions executable by the processor;
    wherein the processor is configured to:
    access a first wireless LAN generated by a routing device when the smart device is in a station mode, wherein an access permission of the first wireless LAN is restricted such that accessing an address of a target server for the first wireless LAN is permitted and accessing other addresses except for that of the target server is forbidden;
    receive, by the smart device, a first encryption protocol packet encrypted using a random code and a second encryption protocol packet encrypted using a server public key sent by the routing device when the smart device is determined as a trusted device by the routing device, wherein the first encryption protocol packet comprises verification information, and the second encryption protocol packet comprises the random code;
    upload the second encryption protocol packet to the target server via the first wireless LAN, such that the target server performs a second decryption on the second encryption protocol packet using a server private key to obtain the random code;
    receive the random code sent by the target server, after the target server determines that the smart device is a device meeting a predetermined condition;
    perform a first decryption on the first encryption protocol packet according to the random code to obtain the verification information; and
    access a second wireless LAN according to the verification information, wherein the second wireless LAN has an unlimited access permission;
    wherein the processor is further configured to:
    judge whether a signal of the routing device exists by monitoring, when the smart device is in an access point mode without any other smart device wirelessly coupled to the smart device;
    detect whether the routing device is of a target type when it is monitored that the signal of the routing device exists, wherein the target type specifies at least one manufacturer;
    judge whether a mode switching condition is met according to a signal strength of the signal of the routing device when it is detected that the routing device is of the target type;
    switch a current network card mode of the smart device from the access point mode to the station mode when the mode switching condition is met.

4. The apparatus according to claim 3, wherein the processor detects whether the routing device is of the target type by:
    acquiring a basic service set identifier (BSSID) of the routing device;
    determining a manufacturer of the routing device according to the BSSID;
    judging whether the manufacturer of the routing device is a specified manufacturer; and determining that the routing device is of the target type if the manufacturer of the routing device is the specified manufacturer.

5. A non-transitory computer-readable storage medium having stored therein instructions that, when executed by a processor of a terminal device, causes the terminal device to:
  access a first wireless LAN generated by a routing device when a smart device is in a station mode, wherein an access permission of the first wireless LAN is restricted such that accessing an address of a target server for the first wireless LAN is permitted and accessing other addresses except for that of the target server is forbidden;
  receive, by the smart device, a first encryption protocol packet encrypted using a random code and a second encryption protocol packet encrypted using a server public key sent by the routing device when the smart device is determined as a trusted device by the routing device, wherein the first encryption protocol packet comprises verification information, and the second encryption protocol packet comprises the random code;
  upload the second encryption protocol packet to the target server via the first wireless LAN, such that the target server performs a second decryption on the second encryption protocol packet using a server private key to obtain the random code;
  receive the random code sent by the target server, after the target server determines that the smart device is a device meeting a predetermined condition;
  perform a first decryption on the first encryption protocol packet according to the random code to obtain the verification information; and
  access a second wireless LAN according to the verification information, wherein the second wireless LAN has an unlimited access permission;
  wherein the instructions further cause the processor to:
  judge whether a signal of the routing device exists by monitoring, when the smart device is in an access point mode without any other smart device wirelessly coupled to the smart device;
  detect whether the routing device is of a target type when it is monitored that the signal of the routing device exists, wherein the target type specifies at least one manufacturer;
  judge whether a mode switching condition is met according to a signal strength of the signal of the routing device when it is detected that the routing device is of the target type;
  switch a current network card mode of the smart device from the access point mode to the station mode when the mode switching condition is met.

6. The non-transitory computer-readable storage medium according to claim 5, wherein the instructions for detecting whether the routing device is of the target type further cause the processor to:
  acquire a basic service set identifier (BSSID) of the routing device;
  determine a manufacturer of the routing device according to the BSSID;
  judge whether the manufacturer of the routing device is a specified manufacturer; and
  determine that the routing device is of the target type if the manufacturer of the routing device is the specified manufacturer.

* * * * *